United States Patent
Kim et al.

(10) Patent No.: US 11,967,822 B2
(45) Date of Patent: Apr. 23, 2024

(54) METHOD FOR PREDICTING POWER GENERATION AND REMAINING USEFUL LIFE PER SYSTEM AND SYSTEM FOR PERFORMING THE SAME

(71) Applicant: KOREA INSTITUTE OF SCIENCE AND TECHNOLOGY, Seoul (KR)

(72) Inventors: Ig Jae Kim, Seoul (KR); Heeseung Choi, Seoul (KR); Yeji Choi, Seoul (KR); Jisoo Kim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 301 days.

(21) Appl. No.: 17/489,805

(22) Filed: Sep. 30, 2021

(65) Prior Publication Data

US 2022/0190596 A1    Jun. 16, 2022

(30) Foreign Application Priority Data

Dec. 11, 2020    (KR) .......................... 10-2020-0173376

(51) Int. Cl.
*H02J 3/00*     (2006.01)
*G05B 13/02*    (2006.01)
*G05B 13/04*    (2006.01)

(52) U.S. Cl.
CPC .......... *H02J 3/004* (2020.01); *G05B 13/0265* (2013.01); *G05B 13/048* (2013.01); *H02J 2203/20* (2020.01)

(58) Field of Classification Search
CPC .. H02J 3/004; H02J 2203/20; G05B 13/0265; G05B 13/048

USPC ......................................................... 700/287
See application file for complete search history.

(56) References Cited

U.S. PATENT DOCUMENTS

| | | | | |
|---|---|---|---|---|
| 2012/0083933 A1* | 4/2012 | Subbu | ...................... | G06N 3/02 700/291 |
| 2016/0196375 A1* | 7/2016 | Nasle | ...................... | G06F 30/20 703/18 |
| 2020/0106294 A1* | 4/2020 | Wenzel | ................... | H02S 40/32 |

(Continued)

FOREIGN PATENT DOCUMENTS

| | | |
|---|---|---|
| JP | 2011-60012 A | 3/2011 |
| JP | 2018-7347 A | 1/2018 |
| KR | 10-1713985 B1 | 3/2017 |

(Continued)

*Primary Examiner* — Jigneshkumar C Patel
(74) *Attorney, Agent, or Firm* — CANTOR COLBURN LLP (57) ABSTRACT

Embodiments relate to a method for predicting power generation and remaining useful life to predict operational soundness of a power plant and a system for performing the same, the method including acquiring sensing data from each of a plurality of sensors included in a plurality of systems in the power plant, outputting each of a predicted power generation and a predicted remaining useful life from a measurement value in sensing data of an input sensor through a pre-trained prediction model, assessing the operational soundness in aspect of the power generation and the remaining useful life using a prediction result and a current result in each aspect, and determining the operational soundness of the system based on prediction uncertainty and an assessment result in aspect of the power generation and the remaining useful life.

19 Claims, 6 Drawing Sheets

(56) References Cited

U.S. PATENT DOCUMENTS

2020/0372588 A1* 11/2020 Shi .......................... G06N 3/08

FOREIGN PATENT DOCUMENTS

| KR | 10-1858121 B1 | 5/2018 |
|---|---|---|
| KR | 10-2067831 B1 | 1/2020 |
| KR | 10-2020-0059704 A | 5/2020 |
| KR | 10-2119661 B1 | 6/2020 |
| KR | 10-2141673 B1 | 8/2020 |
| KR | 10-2020-0119371 A | 10/2020 |
| KR | 10-2257716 B1 | 5/2021 |

* cited by examiner

Example of operational soundness assessment through power generation prediction model

| | | | Remaining useful life prediction model | | | | | | |
|---|---|---|---|---|---|---|---|---|---|
| | | | Normal | | Advisory | | Warning | | |
| | | | Confidence level ↑ | Confidence level ↓ | Confidence level ↑ | Confidence level ↓ | Confidence level ↑ | Confidence level ↓ | |
| Power generation prediction model | Normal | Confidence level ↑ | Normal | Normal | Normal | Normal/Advisory | Normal/Warning | Normal |
| | | Confidence level ↓ | Normal | Normal/Advisory | Normal/Advisory | Advisory | Advisory | Normal/Warning |
| | Advisory | Confidence level ↑ | Normal/Advisory | Advisory | Advisory | Advisory | Warning | Advisory |
| | | Confidence level ↓ | Normal | Normal/Advisory | Advisory/Warning | Advisory | Warning | Advisory/Warning |
| | Warning | Confidence level ↑ | Normal/Warning | Warning | Normal/Warning | Warning | Warning | Warning |
| | | Confidence level ↓ | Normal | Normal/Warning | Advisory | Advisory/Warning | Warning | Warning |

FIG. 5

| | | | Remaining useful life prediction model | | | | | | |
|---|---|---|---|---|---|---|---|---|---|
| | | | Normal | | | Advisory | | | Warning |
| | | | Confidence level → | Confidence level → | Confidence level → | Confidence level → | Confidence level → | Confidence level → | Confidence level → |
| Power generation prediction model | Normal | Confidence level ↓ | Normal | Normal | Normal | Normal | Advisory | Warning | Advisory |
| | | Confidence level ↓ | Normal | Normal | Advisory | Advisory | Advisory | Warning | Advisory |
| | Advisory | Confidence level ↓ | Advisory | Advisory | Advisory | Advisory | Advisory | Warning | Advisory |
| | | Confidence level ↓ | Normal | Advisory | Advisory | Advisory | Warning | Warning | Warning |
| | Warning | Confidence level ↓ | Warning | Warning | Warning | Warning | Warning | Warning | Warning |
| | | Confidence level ↓ | Advisory | Advisory | Advisory | Warning | Warning | Warning | Warning |

METHOD FOR PREDICTING POWER GENERATION AND REMAINING USEFUL LIFE PER SYSTEM AND SYSTEM FOR PERFORMING THE SAME

CROSS-REFERENCE TO RELATED APPLICATION

This application claims priority to Korean Patent Application No. 10-2020-0173376, filed on Dec. 11, 2020, and all the benefits accruing therefrom under 35 U.S.C. § 119, the contents of which in its entirety are herein incorporated by reference.

TECHNICAL FIELD

Embodiments of the present disclosure relate to prediction of operational soundness for a power plant, and more particularly, to a method for predicting the power generation and the remaining useful life for each system in a power plant to predict the operational soundness of the power plant and a system for performing the same.

NATIONAL RESEARCH AND DEVELOPMENT SUPPORT

This work was supported by the Basic Science Research Program (Grant No. 20181110100420) of the Korea Institute of Energy Technology Evaluation and Planning (KETEP) funded by the Ministry of Trade, Industry and Energy, Republic of Korea.

BACKGROUND ART

In general, a power plant includes a plurality of systems, and each system includes a plurality of power generation equipment. Each system or power generation equipment is organically connected to each other. Accordingly, various types of failures may occur in the power generation process. The propagation of a failure in machine and equipment of a certain system to equipment of another system may lead to a greater failure causing huge losses, so early detection of the location of the system at which the failure started for the first time is important.

An environment in the power plant is always monitored in real time through the power generation equipment itself or a plurality of sensors installed near the power generation equipment. A central system installed in the power plant monitors hazards such as equipment failures in the power plant through sensor data.

However, generally, when a measurement value indicating the current condition of the power generation equipment or the power plant reaches or exceeds a preset risk threshold, the existing power generation system notifies the fact.

Accordingly, since it detects the failure in the power plant after the failure occurred, the existing system has limitations on early detection of the location of the system at which the failure started for the first time.

DISCLOSURE

Technical Problem

According to an aspect of the present disclosure, there is provided a system for performing a comprehensive and real-time prediction of the operational soundness of a power plant through a power generation prediction model and a life prediction model defined for each system.

In addition, there are provided a method for predicting the power generation and the remaining useful life for each system to predict the operational soundness of a power plant and a computer-readable recording medium having recorded thereon a program for performing the same.

Technical Solution

A system for predicting power generation and remaining useful life for each system to predict operational soundness of a power plant according to an aspect of the present disclosure includes a plurality of sensors included in a plurality of systems in the power plant, a data acquisition unit to receive sensing data from each of the plurality of sensors, a prediction unit to output a predicted power generation from a measurement value in sensing data of an input sensor through a pre-trained power generation prediction model, and output a predicted remaining useful life from a measurement value in sensing data of an input sensor through a pre-trained life prediction model, and a system assessment unit to assess operational soundness of the system using prediction results and current results in aspect of the power generation and the remaining useful life.

In an embodiment, the power generation prediction model may be configured to calculate the power generation of the corresponding system at a future target time as the predicted power generation when an input dataset including the measurement value of the input sensor is inputted. The life prediction model may be configured to calculate the remaining useful life of the corresponding system at the future target time as the predicted remaining useful life when an input dataset including the measurement value of the input sensor is inputted.

In an embodiment, the data acquisition unit may be further configured to, for each system, form an input dataset including the measurement value of the sensor having correlation with the power generation of the system, and form an input dataset including the measurement value of the sensor having correlation with the remaining useful life of the system.

In an embodiment, the prediction unit may be further configured to calculate prediction uncertainty in the predicted power generation based on the predicted power generation calculated by the power generation prediction model, and calculate prediction uncertainty in the predicted remaining useful life based on the predicted remaining useful life calculated by the life prediction model.

In an embodiment, the prediction unit may calculate the prediction uncertainty in the corresponding prediction result based on intrinsic uncertainty in the data and/or epistemic uncertainty in the model.

In an embodiment, the system assessment unit may be configured to assess the operational soundness in aspect of the power generation for the corresponding system at the target time based on the predicted power generation and a current power generation for each system, assess the operational soundness in aspect of the remaining useful life for the corresponding system at the target time based on the predicted remaining useful life and a current remaining useful life for each system, and assess the operational soundness of the corresponding system based on prediction uncertainty and assessment results in aspect of the power generation and the remaining useful life.

In an embodiment, the system assessment unit may be configured to calculate a power generation assessment index using a difference between the current power generation and the predicted power generation to assess the operational soundness in aspect of the power generation for the system, and determine a power generation assessment level based on the power generation assessment index.

In an embodiment, the system assessment unit may determine a remaining useful life assessment level by comparing the current remaining useful life with the predicted remaining useful life.

In an embodiment, in case of false rejection, the system assessment unit may determine the assessment level at a highest risk rank as the operational soundness of the system.

In an embodiment, the system assessment unit may determine the operational soundness of the system on preferential basis of the prediction uncertainty to determine the operational soundness of the system, and when the operational soundness of the system is determined on preferential basis of the prediction uncertainty, the assessment of the operational soundness of the corresponding system may be completed.

In an embodiment, the system assessment unit may determine the operational soundness of the system further using a difference between the assessment results in aspect of the power generation and the remaining useful life or the risk rank to determine the operational soundness of the system based on the prediction uncertainty and the assessment results in aspect of the power generation and the remaining useful life.

A method for predicting power generation and remaining useful life for each system to predict operational soundness of a power plant, performed by a processor, according to another aspect of the present disclosure includes acquiring sensing data from each of a plurality of sensors included in a plurality of systems in the power plant, calculating a predicted power generation and a predicted remaining useful life from a measurement value in sensing data of an input sensor through a pre-trained prediction model, and calculating prediction uncertainty in the corresponding prediction result, assessing the operational soundness in aspect of the power generation using a prediction result and a current result in aspect of the power generation and assessing the operational soundness in aspect of the remaining useful life using a prediction result and a current result in aspect of the remaining useful life, and determining the operational soundness of the system based on the prediction uncertainty and assessment results in aspect of the power generation and the remaining useful life.

In an embodiment, the method for predicting power generation and remaining useful life may further include, before inputting the sensing data to the prediction model, for each of the plurality of systems, selecting the sensing data of the sensor associated with the power generation of each system and the sensing data of the sensor associated with the remaining useful life of each system.

In an embodiment, calculating the predicted power generation and the predicted remaining useful life may include calculating the predicted power generation from a measurement value in the sensing data of the input sensor through a pre-trained power generation prediction model, calculating the prediction uncertainty in the predicted power generation based on the calculated predicted power generation, calculating the predicted remaining useful life from the measurement value in the sensing data of the input sensor through a pre-trained life prediction model, and calculating the prediction uncertainty in the predicted remaining useful life based on the calculated predicted remaining useful life.

In an embodiment, assessing the operational soundness in aspect of the power generation for the corresponding system at a target time may include calculating a power generation assessment index using a difference between a current power generation and the predicted power generation, and determining a power generation assessment level from the power generation assessment index calculated using a preset range. Assessing the operational soundness in aspect of the remaining useful life for the corresponding system at the target time may include determining a remaining useful life assessment level by comparing a current remaining useful life with the predicted remaining useful life.

In an embodiment, the operational soundness of the system may be determined on preferential basis of the prediction uncertainty to determine the operational soundness of the system, and when the operational soundness of the system is determined on preferential basis of the prediction uncertainty, the assessment of the operational soundness of the corresponding system may be s completed.

In an embodiment, in case that both labeled data associated with the predicted power generation and the predicted remaining useful life indicates a high confidence level, the power generation assessment level or the remaining useful life assessment level may be determined as the operational soundness of the system, in case that any one of labeled data associated with the predicted power generation and the predicted remaining useful life indicates a high confidence level and the other indicates a low confidence level, the assessment result for the prediction result having a higher confidence level may be determined as the operational soundness of the system, in case that both labeled data associated with the predicted power generation and the predicted remaining useful life indicates a low confidence level, when the power generation assessment level and the remaining useful life assessment level match, the matched level may be determined as the operational soundness of the system, or in case that both labeled data associated with the predicted power generation and the predicted remaining useful life indicates a low confidence level, when the power generation assessment level and the remaining useful life assessment level do not match, the power generation assessment level or the remaining useful life assessment level may be determined as the operational soundness of the system.

In an embodiment, the operational soundness of the system may be determined further using a difference between the assessment results in aspect of the power generation and the remaining useful life or the risk rank to determine the operational soundness of the system based on the prediction uncertainty and the assessment results in aspect of the power generation and the remaining useful life.

In an embodiment, in case that any one of labeled data associated with the predicted power generation and the predicted remaining useful life indicates a high confidence level and the other indicates a low confidence level, the assessment result for the prediction result having a higher confidence level may be determined as the operational soundness of the system, in case that both labeled data associated with the predicted power generation and the predicted remaining useful life indicates a high confidence level, the assessment result for the prediction result having a higher risk rank may be determined as the operational soundness of the system, in case that both labeled data associated with the predicted power generation and the predicted remaining useful life indicates a low confidence level, when the power generation assessment level and the remaining useful life assessment level match, the matched level may be determined as the operational soundness of the system, in case that both labeled data associated with the predicted power generation and the predicted remaining useful life indicates a low confidence level, when a difference between the power generation assessment level and the remaining useful life assessment level is 1 level, the assessment result having a higher risk may be determined as the operational soundness of the system, or in case that both labeled data associated with the predicted power generation and the predicted remaining useful life indicates a low confidence level, when a difference between the power generation assessment level and the remaining useful life assessment level is equal to or larger than 2 levels, an intermediate level of the two assessment results may be determined as the operational soundness of the system.

In an embodiment, the method for predicting power generation and remaining useful life may further include generating an operational soundness assessment result of the power plant including the operational soundness of the system assessed for each of the plurality of systems.

A computer-readable recording medium according to still another aspect of the present disclosure has recorded thereon a program for performing the method for predicting power generation and remaining useful life according to the above-described embodiments.

Advantageous Effects

The system according to an aspect of the present disclosure may assist in predicting the location of a system at which a failure occurred in a power plant for the first time by predicting the power generation and the remaining useful life for each system, and further, comprehensively predicting the operational soundness of the power plant.

As a result, it is possible to prevent huge economic losses and loss of human life that may actually occur due to the failure.

The effects of the present disclosure are not limited to the above-mentioned effects, and other effects not mentioned herein will be clearly understood by those skilled in the art from the appended claims.

DESCRIPTION OF DRAWINGS

The following is a brief introduction to necessary drawings in the description of the embodiments to describe the technical solutions of the embodiments of the present disclosure or the existing technology more clearly. It should be understood that the accompanying drawings are for the purpose of describing the embodiments of the present disclosure and are not intended to be limiting of the present disclosure. Additionally, for clarity of description, some elements in the accompanying drawings may be depicted in variously changed forms such as exaggeration and omission.

BEST MODE

The terminology used herein is for the purpose of describing particular embodiments only and is not intended to be limiting of the present disclosure. Unless expressly stated to the contrary, the singular forms as used herein include the plural forms as well. The term "comprises" when used in this specification, specifies the presence of stated features, regions, integers, steps, operations, elements and/or components, but does not preclude the presence or addition of one or more other features, regions, integers, steps, operations, elements and/or components.

Unless otherwise defined, all terms including technical and scientific terms used herein have the same meaning as commonly understood by those skilled in the art. It will be further understood that terms, such as those defined in commonly used dictionaries, should be interpreted as having a meaning that is consistent with their meaning in the context of the relevant art document and the present disclosure, and will not be interpreted in an idealized or overly formal sense unless expressly so defined herein.

Hereinafter, the embodiments of the present disclosure will be described in detail with reference to the accompanying drawings.

Figure 1:
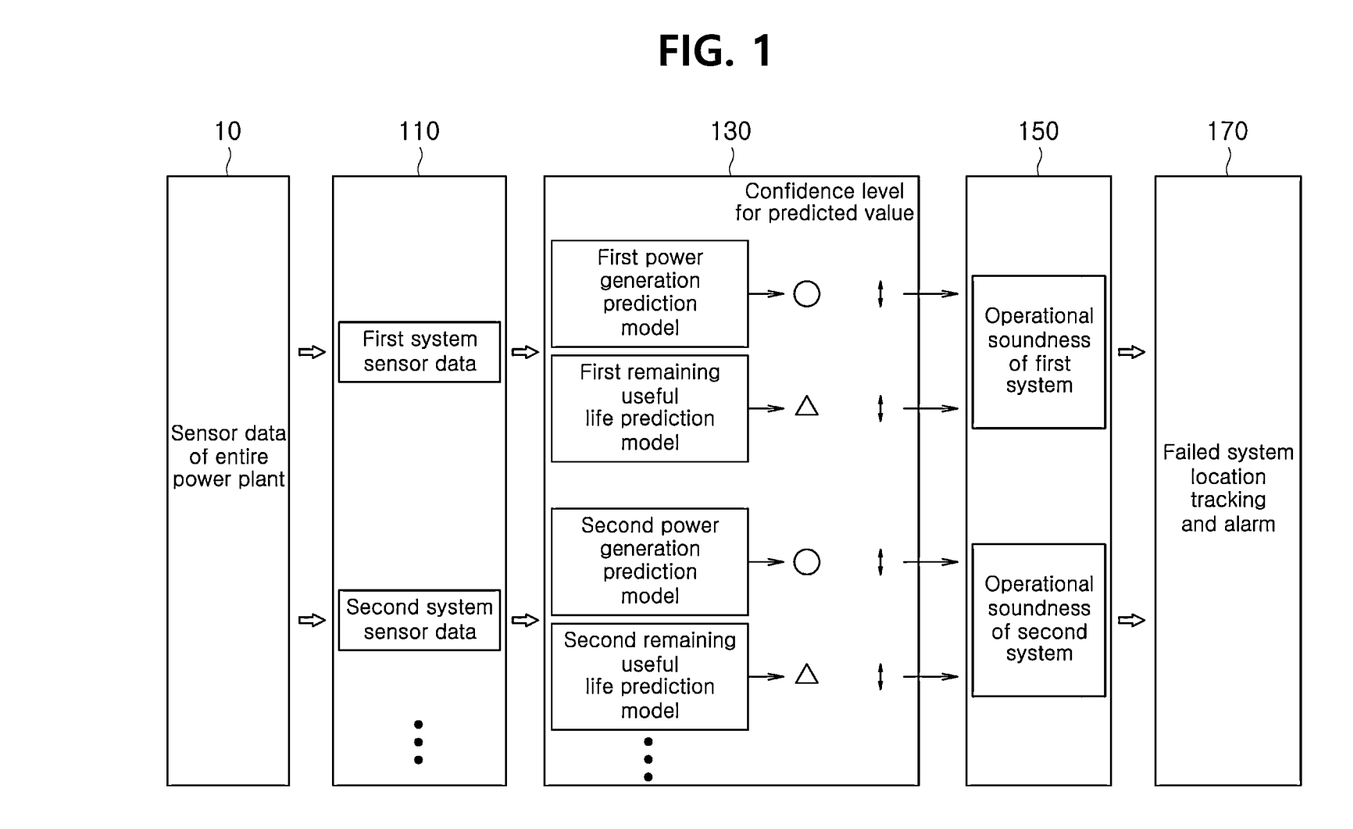
FIG. 1 is a conceptual diagram of a system for predicting the power generation and the remaining useful life for each system to predict the operational soundness of a power plant according to an embodiment of the present disclosure.

FIG. 1 is a conceptual diagram of a system for predicting the power generation and the remaining useful life for each system to predict the operational soundness of a power plant according to an embodiment of the present disclosure.

The system 1 for predicting the power generation and the remaining useful life for each system to predict the operational soundness of a power plant according to embodiments of the present disclosure may predict the operational soundness of the power plant at a future time based on the results of a power generation prediction model and a life prediction model based on deep learning, defined for each system.

Referring to FIG. 1, the system 1 may include a plurality of sensors 10 installed in the power plant, a data acquisition unit 110, a prediction unit 130, a system assessment unit 150 and a power plant assessment unit 170.

The system 1 according to embodiments may have aspects of entirely hardware, entirely software, or partly hardware and partly software. For example, the system may refer collectively to hardware capable of processing data and software that manages the hardware. The term "unit", "module", "device" or "system" as used herein is intended to refer to a combination of hardware and software that runs by the corresponding hardware. For example, the hardware may be a data processing device including a Central Processing Unit (CPU), a Graphic Processing Unit (GPU) or other processor. Additionally, the software may refer to a process being executed, an object, an executable, a thread of execution and a program.

The power plant includes a plurality of systems. Each system may include at least one power generation equipment. The plurality of sensors 10 is installed in the power plant. At least one sensor 10 may be installed for each system.

The plurality of sensors 10 may include, for example, an energy sensor, a temperature sensor, a pressure sensor, a flow sensor, a vibration sensor, a moisture sensor, a gravity sensor, a geomagnetic sensor, a motion sensor, a gyro sensor, an acceleration sensor, a slope sensor, a brightness sensor, a throttle position sensor, an olfactory sensor, a depth sensor, a bending sensor, an audio sensor, an image sensor, or a combination thereof.

The plurality of sensors 10 may acquire information related to the power plant in the detection range and generate sensing data. For example, the plurality of sensors 10 may generate the sensing data including information about the power generation equipment (for example, operation information of the power generation equipment).

The sensing data includes physical information of a target to be measured, a measurement time, a time unit, a measurement value (or signal) and a measurement unit. Additionally, the sensing data may include information related to the corresponding sensor 10. The information related to the corresponding sensor 10 may include identification information of the sensor 10, system information and/or location information (for example, a location in the power plant or an installation location in the power generation equipment) in which the sensor 10 is installed.

In an embodiment, the sensing data may include correlation information. The correlation information includes information about whether the corresponding sensor 10 has correlation with the power generation or the remaining useful life.

The sensing data indicating the operating condition of the power generation equipment is generated by the plurality of sensors 10, and is provided to the other component (for example, the data acquisition unit 110) via wired/wireless electrical communication.

The data acquisition unit 110 receives the sensing data from the plurality of sensors 10, Additionally, the data acquisition unit 110 may select the sensing data having correlation with the power generation of the corresponding system for each system and/or the sensing data having correlation with the remaining useful life of the corresponding system for each system. The power generation of the system depends on the power generation of the power generation equipment in the system, and the remaining useful life of the system depends on the remaining useful life of the power generation equipment in the system.

To this end, sensors having correlation with the power generation or the remaining useful life are pre-selected for each system, and selection information is pre-stored in the data acquisition unit 110. The data acquisition unit 110 selects the sensing data of the sensor 10 having correlation with the power generation and/or the sensing data of the sensor 10 having correlation with the remaining useful life for each system based on the stored selection information.

In general, a few tens to a few tens of thousands of sensors are installed in the power plant. When the predicted power generation of a system to be predicted is calculated using sensing data of sensors having high correlation with the power generation of the system, or the predicted remaining useful life of the system is calculated using sensing data of sensors having high correlation with the remaining useful life of the system, the data processing burden is lessened. As a consequence, the data processing rate is improved by the selection operation of the data acquisition unit 110.

In an embodiment, the sensors 10 having a high correlation with a decreasing tendency of the power generation in the system may be set as sensors having a high correlation with the power generation. In most cases, an emergency situation occurring in the power plant is a decrease in the power generation of the power plant (or the system). For example, when a failure occurs in a power generator, the power generation decreases. Accordingly, the sensing data of the sensors having a high correlation with a power generation drop may be effective in predicting the operational soundness of the power plant with an aim to calculate the predicted power generation.

The prediction unit 130 is configured to output the predicted power generation from the measurement value in the sensing data of the input sensor through a pre-trained power generation prediction model, and the predicted remaining useful life from the measurement value in the sensing data of the input sensor through a pre-trained life prediction model.

The system 1 may use a restoration model trained by other component (for example, a learning module (not shown)) in the system 1, or may receive and use a restoration model pre-trained by an external device disposed outside of the system 1.

The predicted power generation is the amount of power expected to be generated at a specific time after the input time when the measurement value of the input sensor is measured, and the predicted remaining useful life is the expected remaining useful life at the specific time after the input time when the measurement value of the input sensor is measured. The specific time is a future time that the user desires to predict. In some embodiments, the specific time ay be set on the basis of the input time. For example, a value of the power generation or the remaining useful life may be generated after 10 minutes on the basis of the input time.

The prediction unit 130 generates the power generation and the predicted remaining useful life for each system. That is, the corresponding number of pairs of the power generation and the predicted remaining useful life to the number of systems are obtained.

The input sensor includes all or some of the sensors 10 selected. The input sensor may be different for each system. Additionally, the input sensor may be different depending on the power generation prediction model or the life prediction model according to the correlation even in the same system. Accordingly, the power generation prediction model or the life prediction model is individually trained depending on the input sensor of each system.

When an input dataset including the measurement value of the input sensor including all or some of the sensors 10 having correlation with the power generation in the system is inputted, the power generation prediction model is configured to calculate the power generation of the corresponding system at the future target time as the predicted power generation.

The power generation prediction model includes a deep learning based network including a plurality of neuron nodes. The power generation prediction model may have an artificial neural network structure including a Recurrent Neural Network (RNN) based network such as LSTM and GRU, a CNN based network such as DenseNet, ResNet, Temporal convolutional network (TON) or any other network.

The power generation prediction model for the corresponding system is trained using a plurality of training samples, and each of the plurality of training samples includes a training measurement value detected by the input sensor and a value of power generation at the user's desired target time. In case that there is a plurality of sensors having correlation for each system and each target to be predicted, the plurality of training samples for the corresponding system may be subset for each input sensor. For example, when the input sensor includes a current sensor and a flow sensor, a set of training measurement values may be subset for each of the current sensor and the flow sensor.

When the input dataset including the measurement value of the input sensor including all or some of the sensors having correlation with the remaining useful life in the system is inputted, the life prediction model is configured to calculate the remaining useful life of the corresponding system at the future target time as the predicted remaining useful life. The remaining useful life is a predicted value that the component or equipment in the system can be expected to continue to serve its intended function. The life prediction model generates expected results of the remaining useful life period to failure using a history of failures actually occurred in the past.

The life prediction model may have a deep learning based artificial neural network structure, or may be modelled as a linear and/or nonlinear regression model. For example, the life prediction model may be modelled as a deep learning based artificial intelligence model or nonlinear Cox hazards model, a linear and nonlinear regression model for predicting the remaining time to failure such as a time-series regression analysis model, a Cox proportional hazards model or a survival model.

The life prediction model for the corresponding system is trained using a plurality of training samples, and each of the plurality of training samples includes a training measurement value detected by the input sensor and a value of the life prediction model at the user's desired target time.

Additionally, the prediction unit 130 may be further configured to calculate prediction uncertainty based on the prediction results of the prediction model for each system. Then, the prediction unit 130 calculates, for each system, the prediction uncertainty in the predicted power generation, and the life prediction model calculates the prediction uncertainty in the predicted remaining useful life. The prediction uncertainty may be indicated as the confidence level.

In an embodiment, the prediction unit 130 may calculate the prediction uncertainty (i.e., the confidence level) in the system based on intrinsic uncertainty in the data and/or epistemic uncertainty in the model.

The intrinsic uncertainty in the data is uncertainty that exists due to the unique variability in the data within the input dataset. The prediction unit 130 carries out modeling to calculate the intrinsic uncertainty based on a plurality of prediction results obtained from a plurality of input test datasets augmented in the training process of the prediction model.

For example, the prediction unit 130 may calculate the intrinsic uncertainty by calculating the dispersion of the prediction results through Test Time Augmentation (TTA). However, the intrinsic uncertainty calculation technique is not limited thereto.

The epistemic uncertainty in the model is uncertainty in the model caused by a lack of information included in the input dataset. The prediction unit 130 may calculate the epistemic uncertainty in the model based on the prediction results obtained by sampling some data in the training process.

For example, the prediction unit 130 may calculate the epistemic uncertainty in the corresponding model by calculating the dispersion of the prediction results obtained by dropout sampling such as Monte Carlo Dropout (MC Dropout) using Bayesian approximation. However, the technique for calculating the epistemic uncertainty in the model is not limited thereto.

The confidence level may be classified into a plurality of classes. For example, the prediction unit 130 may generate labeling results indicating a high confidence level or labeling results indicating a low confidence level based on the value of the confidence level. Then, the prediction results calculated by the prediction model are associated with the labeling results indicating the confidence level.

The prediction unit 130 forms the input dataset to be inputted to the models for each system and each model, and inputs the formed input dataset to each corresponding model to calculate the prediction results (i.e., the predicted power generation and the predicted remaining useful life) for the target to be predicted and the prediction uncertainty (i.e., the confidence level for the predicted power generation and the confidence level for the predicted remaining useful life).

When the input measurement value is a continuous signal over at least part of the range, the prediction value is generated as a prediction signal.

The prediction unit 130 provides the prediction value (or signal) to the system assessment unit 150.

The system assessment unit 150 is configured to assess the operational soundness of the system using the prediction results and the current results.

When the future target time that the user desires to predict is set to be after a period of time T from the reference time (for example, the input time), the system assessment unit 150 may assess the operational soundness in aspect of the power generation for the corresponding system at the target time based on the predicted power generation and the current power generation for each system. The system assessment unit 150 may assess the operational soundness in aspect of the remaining useful life for the corresponding system at the target time based on the predicted remaining useful life and the current remaining useful life for each system.

The current power generation information and the current remaining useful life information is acquired from the sensing data. For example, the system assessment unit 150 may calculate the current power generation information and/or the current remaining useful life information based on the sensing data.

Figure 2A:
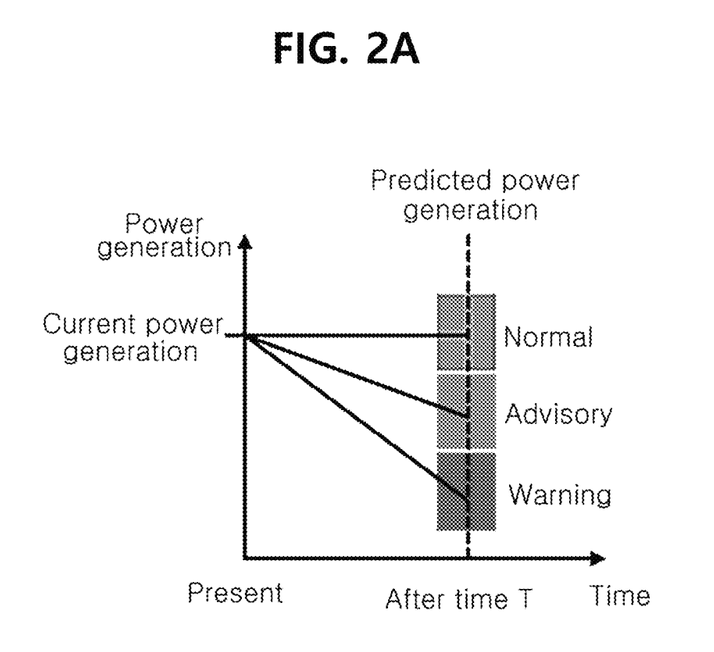
FIGS. 2A and 2B are conceptual diagrams of a process of assessing the system soundness in aspect of the power generation according to an embodiment of the present disclosure.
Figure 2B:
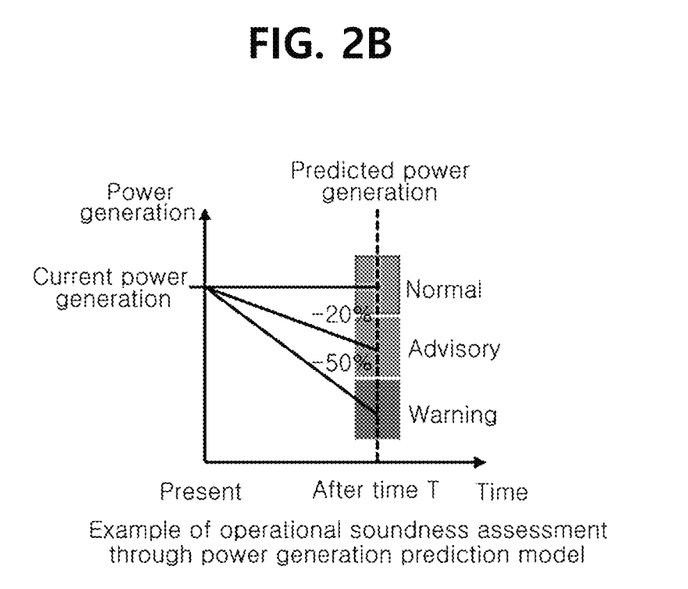

FIGS. 2A and 2B are conceptual diagrams of a process of assessing the system soundness in aspect of the power generation according to an embodiment of the present disclosure.

Referring to FIG. 2A, the system assessment unit 150 may calculate a power generation assessment index using a difference between the current power generation and the predicted power generation. The power generation assessment index is an analytical index for the operational soundness of the system at the future target time in aspect of the power generation, and is used to assess the system soundness in aspect of the power generation.

In an embodiment, the system assessment unit 150 may calculate the power generation assessment index according to a percentage increase/decrease of the predicted power generation to the current power generation. The power generation assessment index is calculated through the following Equation:

$$\text{Power generation assessment index} = (\text{Predicted power generation} - \text{Current power generation}) / \text{Current power generation} \quad \text{[Equation 1]}$$

Then, the system assessment unit 150 may determine a power generation assessment level based on the power generation assessment index. The power generation assessment level may be classified into a plurality of classes, allocated with risk ranks. In this instance, as the risk rank is higher, the failure risk is higher.

The range of power generation assessment indices for each level is preset, and depends on the index calculation process. The range may be set according to the user input or the past operation history.

For example, as shown in FIGS. 2A and 2B, three power generation assessment levels may be set, and each level may be classified into three classes, normal, advisory and warning. In this case, the warning, advisory and normal are allocated with higher risk ranks in that order. The range of warning may be set to 10<power generation assessment index<−7, the range of advisory may be set to −7<power generation assessment index<−3, and the range of normal may be set to −3<power generation assessment index. However, the values in the assessment range are provided for illustrative purposes only and it will be obvious to those skilled in the art that the embodiments of the present disclosure are not limited thereto. The values in the assessment range may be individually set depending on the power plant to which the system 1 is applied and the measurement value for each system.

Additionally, a sort of scaling process of calculating the power generation assessment index is not limited by the description of the above embodiment.

In another embodiment, the power generation assessment index may be calculated in percentage (%). For example, power generation assessment data in percentage (%) may be obtained by converting the calculated value of Equation 1. Here, the power generation assessment index in percentage may not be a probability, and thus the power generation assessment index may have a negative value or a value greater than 100%.

Then, as shown in FIG. 2B, the range of warning may be set to power generation assessment index (%)<−50%, the range of advisory may be set to −50%<power generation assessment index (%)<−20%, and the range of normal may be set to −20%<power generation assessment index (%).

Figure 3:
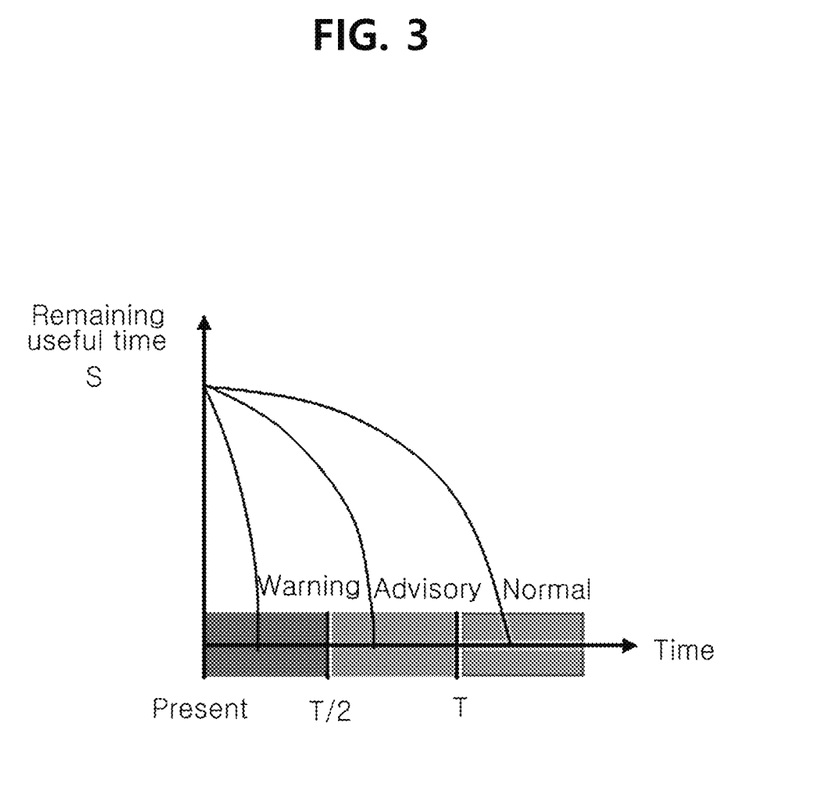
FIG. 3 is a conceptual diagram of a process of assessing the system soundness in aspect of the remaining useful life according to an embodiment of the present disclosure.

FIG. 3 is a conceptual diagram of a process of assessing the system soundness in aspect of the remaining useful life according to an embodiment of the present disclosure.

Referring to FIG. 3, the system assessment unit 150 may determine a remaining useful life assessment index by comparing the current remaining useful life with the predicted remaining useful life. The remaining useful life assessment index is an analytical index for the operational soundness of the system at the future target time in aspect of the remaining useful life.

For example, as shown in FIG. 3, the system assessment unit 150 may compare the obtained current remaining useful life S with the target time T. Alternatively, the system assessment unit 150 may calculate a difference between the current remaining useful life S and the target time T and use the calculation result as the remaining useful life assessment index.

Additionally, the system assessment unit 150 may determine a remaining useful life assessment level based on the remaining useful life assessment index. The remaining useful life assessment level may be classified into a plurality of classes. The range of remaining useful life assessment indices for each level is preset, and depends on the index calculation process. The range may be set according to the user input or the past operation history.

For example, as shown in FIG. 3, three remaining useful life assessment levels may be set, and each level may be classified into three classes, normal, advisory and warning. The range of warning may be set to S<T, the range of advisory class may be set to T/2<S<T, and the range of normal may be set to T<S.

Additionally, the system assessment unit 150 may determine the operational soundness of the system based on the prediction results and/or the assessment results in each aspect.

In certain embodiments, the system assessment unit 150 may be configured to assess the maximum operational risk as the operational soundness of the system, in case of false rejection where the prediction result that actually matches the future is erroneously determined. Since the operational risk is higher, the risk rank is higher, the assessment result (i.e., the assessment level) at the highest risk rank is determined as the operational soundness of the system.

When the prediction of an abnormal situation such as malfunction fails and a proper action is not taken, a very large loss occurs due to the nature of the power plant. When the risk of false rejection is set to be assessed as the highest risk, a decision may be made to minimize the risk of the entire system.

The system assessment unit 150 may make a decision to assess the operational soundness of the system using a decision table that defines a risk environment. The decision table is based on the assessment results and/or prediction uncertainty for each prediction target.

Figure 4:
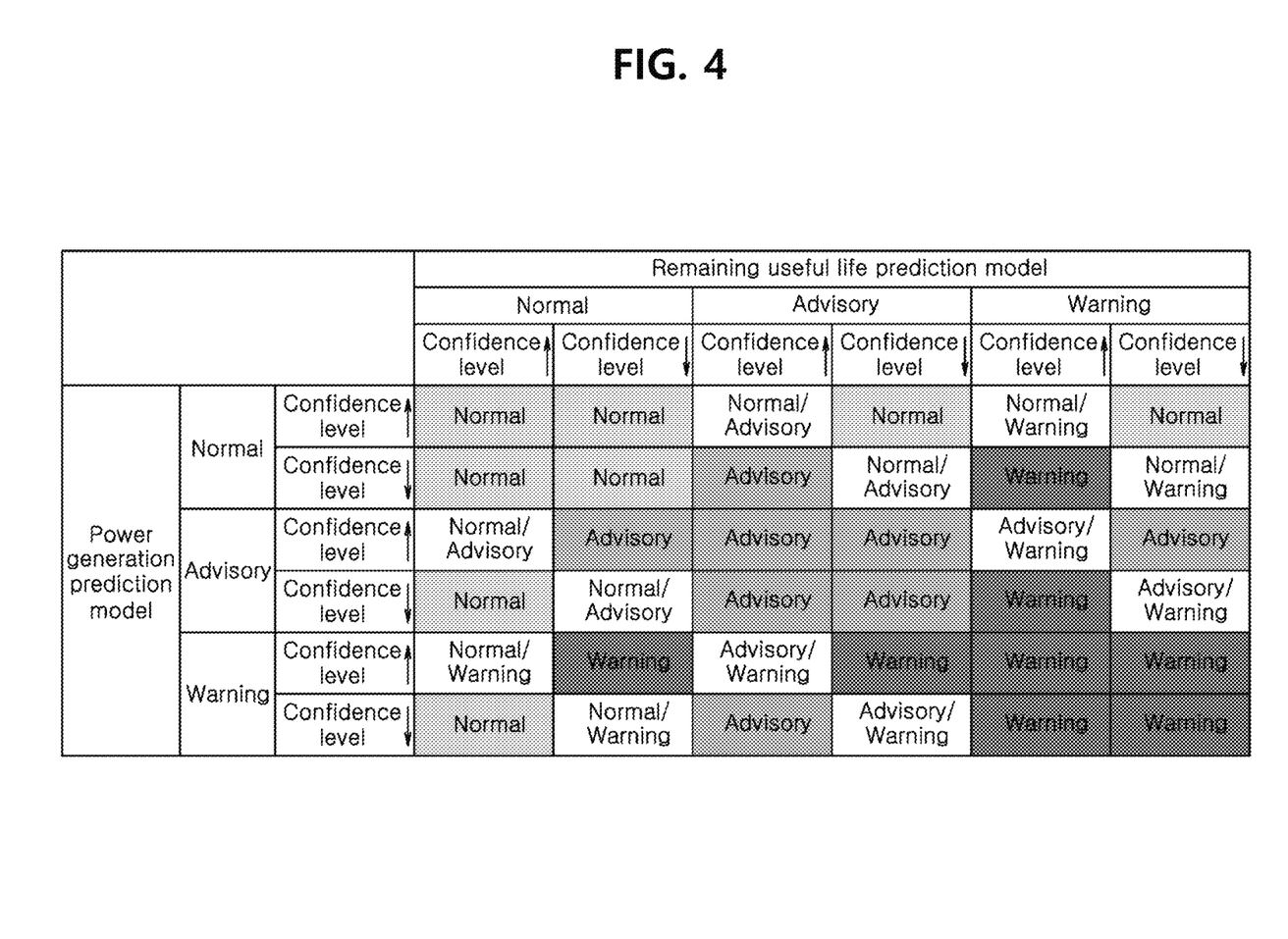
FIG. 4 is s diagram showing a decision table for determining the operational soundness of system according to an embodiment of the present disclosure.

FIG. 4 is s diagram showing the decision table for determining the operational soundness of the system according to an embodiment of the present disclosure.

Referring to FIG. 4, to determine the operational soundness of the system based on the prediction uncertainty and the assessment results of the target to be predicted, the system assessment unit 150 may determine the operational soundness of the system on preferential basis of the prediction uncertainty (i.e., the confidence level). When the operational soundness of the system is determined on preferential basis of the confidence level, the operational soundness assessment of the corresponding system may be completed.

In case that both labeled data associated with the predicted power generation and the predicted remaining useful life indicates a high confidence level, the system assessment unit 150 may determine the power generation assessment level or the remaining useful life assessment level as the operational soundness of the system.

In case that any one of labeled data associated with the predicted power generation and the predicted remaining useful life indicates a high confidence level and the other indicates a low confidence level, the system assessment unit 150 may determine the assessment result for the prediction result having a higher confidence level as the operational soundness of the system. For example, in case that the remaining useful life assessment level having a high confidence level is normal and the power generation assessment level having a low confidence level is warning, as shown in FIG. 4, the system assessment unit 150 may determine the operational soundness of the system as normal which is the remaining useful life assessment level having a high confidence level.

In case that both labeled data associated with the predicted power generation and the predicted remaining useful life indicates a low confidence level, when the power generation assessment level and the remaining useful life assessment level match, the system assessment unit 150 may determine the matched level as the operational soundness of the system.

In case that both labeled data associated with the predicted power generation and the predicted remaining useful life indicates a low confidence level, when the power generation assessment level and the remaining useful life assessment level do not match, the system assessment unit 150 may determine the power generation assessment level or the remaining useful life assessment level as the operational soundness of the system.

In an embodiment, when determining any one of the power generation assessment level and the remaining useful life assessment level as the operational soundness of the system, the system assessment unit 150 may determine the level at a higher risk rank as the operational soundness of the system.

For example, in case that the remaining useful life assessment level having a high confidence level is normal and the power generation assessment level having a high confidence level is warning, the system assessment unit 150 may determine warning which is the power generation assessment level having a higher risk rank as the operational soundness of the system.

Figure 5:
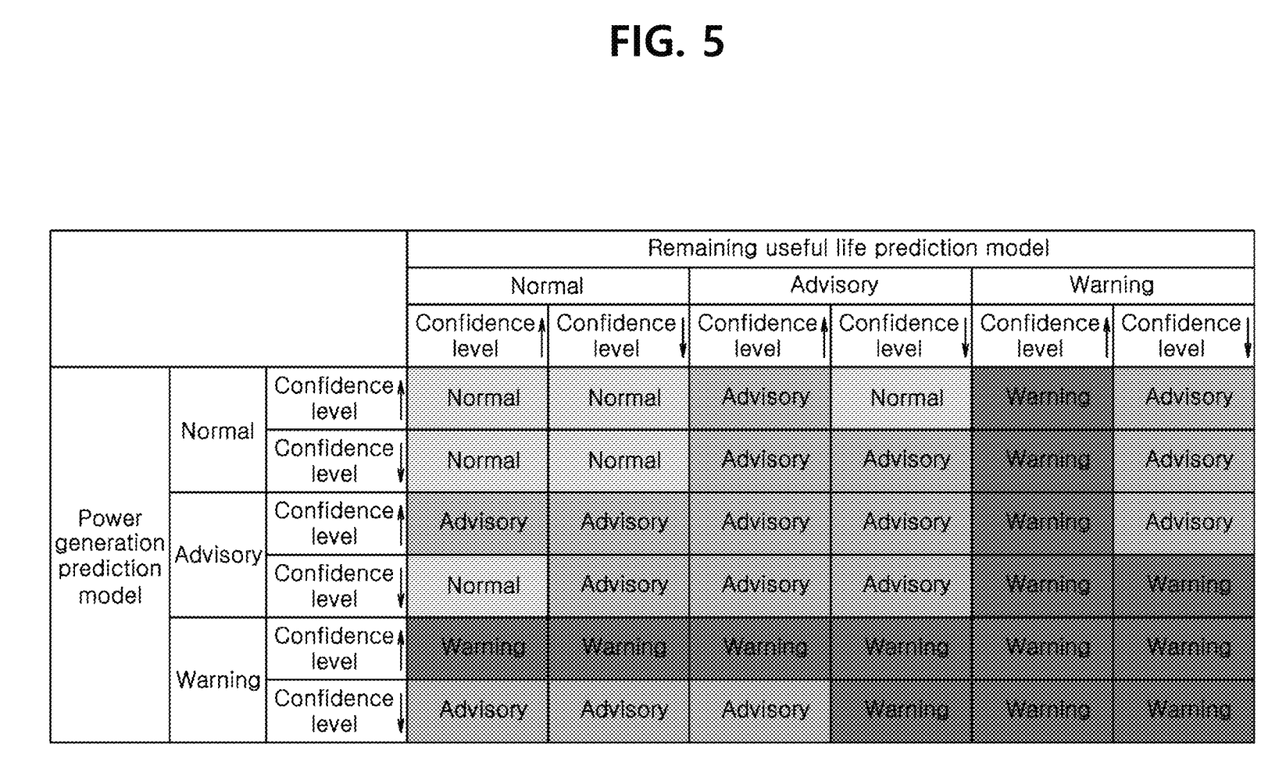
FIG. 5 is s diagram showing a decision table for determining the operational soundness of system according to another embodiment of the present disclosure.

FIG. 5 is s diagram showing the decision table for determining the operational soundness of the system according to another embodiment of the present disclosure.

Referring to FIG. 5, the system assessment unit 150 may additionally use a difference between the assessment results or the risk rank to determine the operational soundness of the system based on the prediction uncertainty and the assessment results of the target to be predicted. That is, also in this case, the operational soundness of the system is determined on preferential basis of the confidence level.

The system assessment unit 150 assesses the operational soundness of the system based on the confidence level for the predicted power generation and the predicted remaining useful life, and a difference between the power generation assessment level and the remaining useful life assessment level.

In case that any one of labeled data associated with the predicted power generation and the predicted remaining useful life indicates a high confidence level and the other indicates a low confidence level, the system assessment unit 150 may determine the assessment result for the prediction result having a higher confidence level as the operational soundness of the system.

In case that both labeled data associated with the predicted power generation and the predicted remaining useful life indicates a high confidence level, the system assessment unit 150 may determine the assessment result for the prediction result having a higher risk rank as the operational soundness of the system. For example, in case that the remaining useful life assessment level having a high confidence level is normal and the power generation assessment level having a high confidence level is warning, the system assessment unit 150 may determine warning which is the power generation assessment level having a higher risk rank as the operational soundness of the system.

In case that both labeled data associated with the predicted power generation and the predicted remaining useful life indicates a low confidence level, when the power generation assessment level and the remaining useful life assessment level match, the system assessment unit 150 may determine the matched level as the operational soundness of the system.

In case that both labeled data associated with the predicted power generation and the predicted remaining useful life indicates a low confidence level, when a difference between the power generation assessment level and the remaining useful life assessment level is 1 level, the system assessment unit 150 may determine the assessment result having a higher risk as the operational soundness of the system.

For example, in case that the remaining useful life assessment level having a low confidence level is normal and the power generation assessment level having a low confidence level is advisory, the system assessment unit 150 may determine advisory which is the power generation assessment level having a higher risk rank as the operational soundness of the system.

In case that both labeled data associated with the predicted power generation and the predicted remaining useful life indicates a low confidence level, when a difference between the power generation assessment level and the remaining useful life assessment level is 2 levels, the system assessment unit 150 may determine the intermediate level of the two assessment results as the operational soundness of the system.

For example, in case that the remaining useful life assessment level having a low confidence level is normal and the power generation assessment level having a low confidence level is warning, the system assessment unit 150 may determine advisory which is the intermediate level between normal and warning as the operational soundness of the system as shown in FIG. 5. As described above, when the operational soundness of the system is determined as the intermediate level due to the difference in assessment level, it is possible to achieve conservative and neutral assessment without bias.

The system assessment unit 150 provides the determined operational soundness assessment result of the system to the power plant assessment unit 170.

As the power plant includes a plurality of systems, the system assessment unit 150 may generate the result of assessing the operational soundness of the corresponding system for each of the plurality of systems and provide it to the power plant assessment unit 170.

The power plant assessment unit 170 may receive the operational soundness of the system assessed for each system and generate the operational soundness prediction result of the power plant.

In an embodiment, the operational soundness prediction result of the power plant may include the assessed operational soundness for each system. Additionally, the operational soundness prediction result of the power plant may further include information about the corresponding system. The information about the corresponding system includes description and location information of the system.

Additionally, the operational soundness prediction result of the power plant may further include the prediction result, the prediction uncertainty, the assessment result in aspect of the power generation (for example, the power generation assessment level) and/or the assessment result in aspect of the remaining useful life (for example, the remaining useful life assessment level).

The operational soundness prediction result of the power plant may be used to warn an accident of the power plant in advance. To this end, when the operational soundness assessment result for each system is at dangerous level, the power plant assessment unit 170 may provide an alarm including the assessment result and location of the corresponding system to the user.

Additionally, the operational soundness prediction result of the power plant may be used to analyze a failure pattern according to the operational soundness assessment result for each system. The power plant assessment unit 170 may obtain a future actual operating situation of the power plant after the input time and define the failure pattern based on the operational soundness prediction result of the power plant.

For example, when an assessment pattern in the order of advisory for a first system, advisory for a second system, and warning for the first system is received before an accident occurs in the power plant, the power plant assessment unit 170 may store the corresponding order as a first failure pattern.

Each unit in the system according to embodiments may not be necessarily limited to being implemented as a single component in the system. That is, although FIG. 1 shows that the data acquisition unit 110, the prediction unit 130, and the system assessment unit 150 are a single block, they may be implemented as separate distinguishable blocks for each system according to embodiments. For example, the system 1 may include a first data acquisition unit 110-1, a first prediction unit 130-1 and a first system assessment unit 150-1 for the first system.

It will be obvious to those skilled in the art that the system 1 may include other components not described herein. For example, the system 1 may include other hardware components necessary for the operation described herein, including a network interface, an input device for data entry, and a display, a printer or any other output device for data display.

The method for predicting the power generation and the remaining useful life for each system to predict the operational soundness of the power plant according to another aspect of the present disclosure may be performed by a processor. For example, the method for predicting the power generation and the remaining useful life for each system to predict the operational soundness of the power plant may be performed by the processor including the system 1 of FIG. 1.

Figure 6:
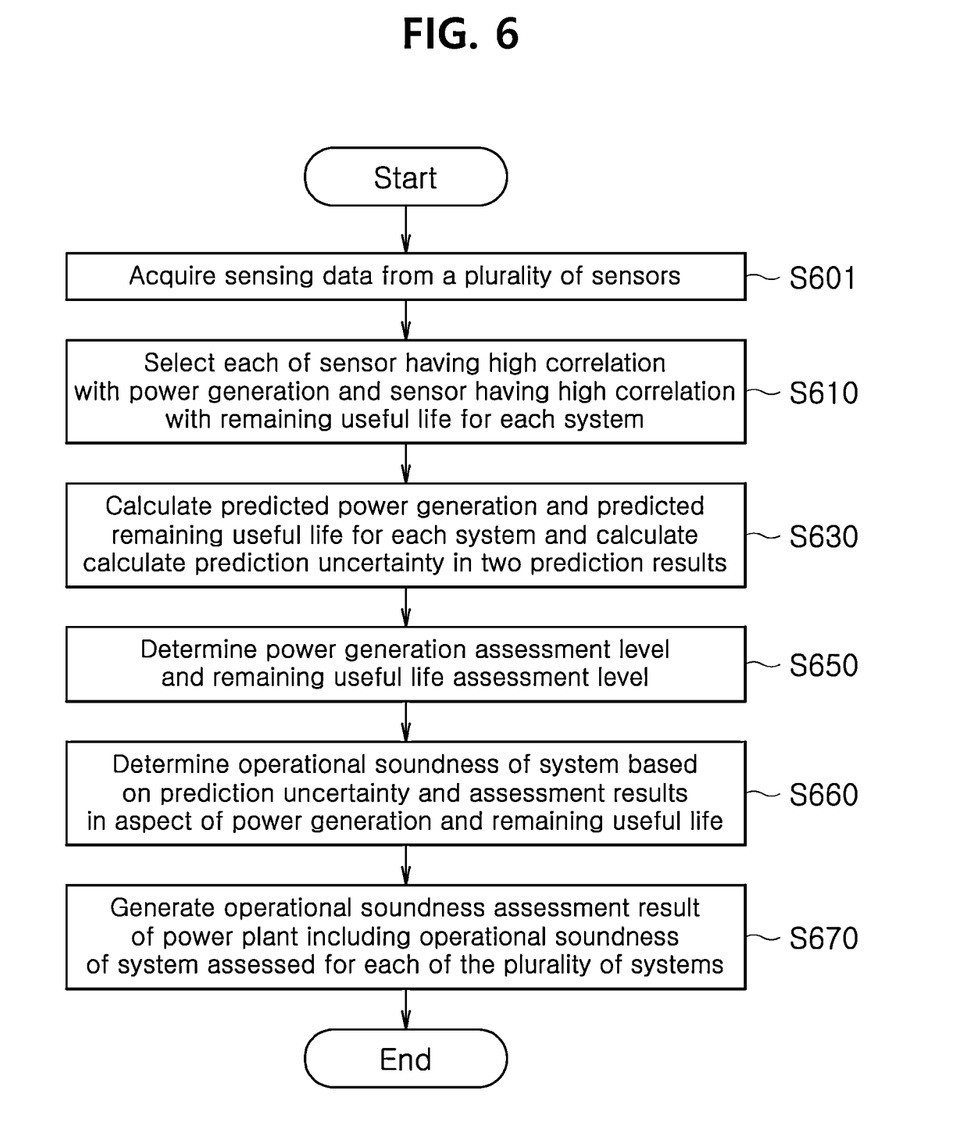
FIG. 6 is a flowchart of a method for assessing the operational soundness of system according to an embodiment of the present disclosure.

FIG. 6 is a flowchart of a method for assessing the operational soundness of system according to an embodiment of the present disclosure.

Referring to FIG. 6, the method includes acquiring sensing data from the plurality of sensors 10 (S601). The plurality of sensors 10 is included in a plurality of systems in the power plant. The sensing data of each sensor 10 includes a measurement value of the corresponding sensor 10.

The method includes, for each of the plurality of systems, calculating predicted power generation and predicted remaining useful life for each system and calculating prediction uncertainty in the two prediction results (S630).

The step S630 includes calculating the predicted power generation by inputting the measurement value of the input sensor to a pre-trained power generation prediction model, and calculating the predicted remaining useful life by inputting the measurement value of the input sensor to a pre-trained life prediction model.

When an input dataset including the measurement value of the input sensor including all or some of the sensors 10 having correlation with the power generation in the system is inputted, the power generation prediction model is configured to calculate future power generation of the corresponding system as the predicted power generation.

When an input dataset including the measurement value of the input sensor including all or some of the sensors having correlation with the remaining useful life in the system is inputted, the life prediction model is configured to calculate future remaining useful life of the corresponding system as the predicted remaining useful life. The remaining useful life is a predicted value that the component or equipment in the system can be expected to continue to serve its intended function. The life prediction model generates an expected result of the remaining useful life period to failure using a history of failures actually occurred in the past.

Additionally, the step S630 includes calculating the prediction uncertainty in the predicted power generation based on the calculated predicted power generation, and the prediction uncertainty in the predicted remaining useful life based on the calculated predicted remaining useful life.

In an embodiment, the prediction uncertainty may be based on intrinsic uncertainty and/or epistemic uncertainty in data. The prediction uncertainty may be generated by applying a preset prediction uncertainty technique to the corresponding prediction result calculated by the prediction model.

The prediction uncertainty calculation result is outputted as the confidence level.

In some embodiments, the uncertainty may be calculated as a class indicating the confidence level such as a high confidence level or a low confidence level. Then, the predicted power generation is associated with the confidence level class for the predicted power generation calculated by the power generation prediction model. The predicted remaining useful life is associated with the confidence level class for the predicted remaining useful life calculated by the life prediction model.

The prediction result calculated in the step S630 and its confidence level may be used to assess the operational soundness of the system.

The step S630 using the prediction model has been described above and its detailed description is omitted.

In an embodiment, the method may further include, before the step S630, for each of the plurality of systems, selecting sensing data of the sensor associated with the power generation of each system and sensing data of the sensor associated with the remaining useful life of each system (S610). The selection of the sensor is performed based on correlation between the target to be predicted and the measurement value of the sensor.

The sensor associated with the power generation is used as the input sensor of the power generation prediction model, and the selected sensing data forms the input dataset of the power generation prediction model. The sensor associated with the remaining useful life is used as the input sensor of the life prediction model, and the selected sensing data forms the input dataset of the life prediction model.

The method includes assessing the operational soundness in aspect of the power generation using the prediction results and the current results in aspect of the power generation, and assessing the operational soundness in aspect of the remaining useful life using the prediction results and the current results in aspect of the remaining useful life (S650).

The current results are obtained based on the sensing data obtained in the step S601. The operational soundness in each aspect may be assessed as the assessment level.

The step of assessing the operational soundness in aspect of the power generation for the corresponding system at the target time includes calculating a power generation assessment index using a difference between the current power generation and the predicted power generation, and determining a power generation assessment level from the power generation assessment index calculated using a preset range.

In an embodiment, the power generation assessment index may be calculated according to a percentage increase/decrease of the predicted power generation to the current power generation (S650). The operational soundness of the system in aspect of the power generation is assessed by grading the index calculation result into levels.

In certain embodiments, three power generation assessment levels may be set, and each level may be classified into three classes, normal, advisory and warning. In this case, warning, advisory and normal are allocated with higher risk ranks in that order.

The operational soundness in aspect of the power generation is assessed by the indication of the determined class.

The step of assessing the operational soundness in aspect of the power generation for the corresponding system at the target time has been described above with reference to FIG. 2 and its detailed description is omitted.

The step of assessing the operational soundness in aspect of the remaining useful life for the corresponding system at the target time may include determining a remaining useful life assessment level by comparing the current remaining useful life with the predicted remaining useful life.

When the remaining useful life assessment level is directly determined from the current remaining useful life and the predicted remaining useful life, the operational soundness of the system in aspect of the remaining useful life is assessed by grading the comparison result into levels.

In certain embodiments, three remaining useful life assessment levels may be set, and each level may be classified into three classes, normal, advisory and warning. The range of warning may be set to S<T, the range of advisory may be set to T/2<S<T, and the range of normal may be set to T<S.

The step of assessing the operational soundness in aspect of the remaining useful life for the corresponding system at the target time has been described above with reference to FIG. 3 and its detailed description is omitted.

Additionally, the method includes determining the operational soundness of the system based on the prediction uncertainty and the assessment results in aspect of the power generation and the remaining useful life (S660).

The operational soundness of the system is comprehensively assessed based on the confidence level of the predicted power generation calculated with the prediction uncertainty in the step S630, the power generation assessment level determined in the step S656, the confidence level for the predicted remaining useful life calculated in the step S630 and the remaining useful life assessment level determined in the step S650.

The operational soundness of the system is determined on preferential basis of the confidence level (S660).

In case that both labeled data associated with the predicted power generation and the predicted remaining useful life indicates a high confidence level, the power generation assessment level or the remaining useful life assessment level may be determined as the operational soundness of the system (S660).

Alternatively, in case that any one of labeled data associated with the predicted power generation and the predicted remaining useful life indicates a high confidence level and the other indicates a low confidence level, the assessment result for the prediction result having a higher confidence level may be determined as the operational soundness of the system (S660).

Alternatively, in case that both labeled data associated with the predicted power generation and the predicted remaining useful life indicates a low confidence level, when the power generation assessment level and the remaining useful life assessment level match, the matched level may be determined as the operational soundness of the system (S660).

Alternatively, in case that both labeled data associated with the predicted power generation and the predicted remaining useful life indicates a low confidence level, when the power generation assessment level and the remaining useful life assessment level do not match, the power generation assessment level or the remaining useful life assessment level may be determined as the operational soundness of the system (S660).

In an embodiment, in case that any one of the power generation assessment level and the remaining useful life assessment level is determined as the operational soundness of the system, the level at a higher risk rank may be determined as the operational soundness of the system (S660).

The step S660 according to embodiments has been described above with reference to FIG. 4 and its detailed description is omitted.

In another embodiment, the operational soundness of the system may be determined further using a difference between the assessment results or the risk rank (S660). The operational soundness of the system is assessed based on the confidence level for the predicted power generation and the predicted remaining useful life and a difference between the power generation assessment level and the remaining useful life assessment level (S660).

In case that any one of labeled data associated with the predicted power generation and the predicted remaining useful life indicates a high confidence level and the other indicates a low confidence level, the assessment result for the prediction result having a higher confidence level is determined as the operational soundness of the system (S660).

Alternatively, in case that both labeled data associated with the predicted power generation and the predicted remaining useful life indicates a high confidence level, the assessment result for the prediction result having a higher risk rank is determined as the operational soundness of the system (S660).

Alternatively, in case that both labeled data associated with the predicted power generation and the predicted remaining useful life indicates a low confidence level, when the power generation assessment level and the remaining useful life assessment level match, the matched level is determined as the operational soundness of the system (S660).

Alternatively, in case that both labeled data associated with the predicted power generation and the predicted remaining useful life indicates a low confidence level, when a difference between the power generation assessment level and the remaining useful life assessment level is 1 level, the assessment result having a higher risk is determined as the operational soundness of the system (S660).

Alternatively, in case that both labeled data associated with the predicted power generation and the predicted remaining useful life indicates a low confidence level, when a difference between the power generation assessment level and the remaining useful life assessment level is equal to or larger than 2 levels, the intermediate level of the two assessment results is determined as the operational soundness of the system (S660).

The step S660 according to another embodiment has been described above with reference to FIG. 5 and its detailed description is omitted.

The method includes generating the operational soundness assessment result of the power plant including the operational soundness of the system assessed for each of the plurality of systems (S670).

In an embodiment, the operational soundness prediction result of the power plant may include the assessed operational soundness for each system. Additionally, information about the corresponding system may be further included.

The information about the corresponding system includes description and location information of the system.

Additionally, the step S670 may include providing a warning to the user using the generated operational soundness prediction result of the power plant. When the operational soundness assessment result for each system is at dangerous level, an alarm including the assessment result and the location of the corresponding system is provided to the user (S670).

The system 1 according to embodiments as described above assesses the operational soundness for each system to comprehensively analyze the situation of the power plant. The operational soundness of the system is comprehensively analyzed in aspect of both the power generation and the remaining useful life.

The method for predicting the power generation and the remaining useful life for each system to predict the operational soundness of the power plant according to embodiments as described above and the operation by the system 1 for performing the same may be, at least in part, implemented in a computer program and recorded in a computer-readable recording medium. For example, it may be implemented with a program product on the computer-readable medium including program code, and may be executed by the processor for performing any or all of the above-described steps, operations or processes.

The computer may be a computing device such as a desktop computer, a laptop computer, a notebook computer, a smart phone or like, and may be any integrated device. The computer is a device having at least one alternative and specialized processor, memory, storage and networking component (either wireless or wired). For example, the computer may run Microsoft Windows-compatible operating systems (OSs) and OSs such as Apple OS X or iOS, Linux distribution, or Google's Android OS.

The computer-readable recording medium includes any type of recording and identity verification device in which computer-readable data is stored. Examples of the computer-readable recording medium include read only memory (ROM), random access memory (RAM), compact disc read only memory (CD-ROM), magnetic tape, floppy disk, and optical data storage and identity verification devices. Additionally, the computer-readable recording medium is distributed over computer systems connected via a network, and may store and execute the computer-readable code in a distributed manner. Additionally, a functional program, code and a code segment for realizing this embodiment will be easily understood by persons having ordinary skill in the technical field to which this embodiment belongs.

While the present disclosure has been hereinabove described with reference to the embodiments shown in the drawings, this is provided by way of illustration and those skilled in the art will understand that various modifications and variations may be made thereto. However, it should be understood that such modifications fall within the scope of technical protection of the present disclosure. Accordingly, the true technical protection scope of the present disclosure should be defined by the technical spirit of the appended claims.

The invention claimed is:

1. A system for predicting power generation and remaining useful life for each system to predict operational soundness of a power plant, the system comprising:
   a plurality of sensors included in a plurality of systems in the power plant;
   a data acquisition unit to receive sensing data from each of the plurality of sensors;
   a prediction unit to output a predicted power generation from a measurement value in sensing data of an input sensor through a pre-trained power generation prediction model, and output a predicted remaining useful life from a measurement value in sensing data of an input sensor through a pre-trained life prediction model; and
   a system assessment unit to assess operational soundness of the system using prediction results and current results in aspect of the power generation and the remaining useful life, wherein the system assessment unit is configured to:
   assess the operational soundness in aspect of the power generation for the corresponding system at a target time based on the predicted power generation and the current power generation for each system,
   assess the operational soundness in aspect of the remaining useful life for the corresponding system at the target time based on the predicted remaining useful life and a current remaining useful life for each system, and
   assess the operational soundness of the corresponding system based on prediction uncertainty and assessment results in aspect of the power generation and the remaining useful life.

2. The system according to claim 1, wherein the power generation prediction model is configured to calculate the power generation of the corresponding system at a future target time as the predicted power generation when an input dataset including the measurement value of the input sensor is inputted, and
   the life prediction model is configured to calculate the remaining useful life of the corresponding system at the future target time as the predicted remaining useful life when an input dataset including the measurement value of the input sensor is inputted.

3. The system according to claim 2, wherein the prediction unit is further configured to:
   calculate prediction uncertainty in the predicted power generation based on the predicted power generation calculated by the power generation prediction model, and
   calculate prediction uncertainty in the predicted remaining useful life based on the predicted remaining useful life calculated by the life prediction model.

4. The system according to claim 3, wherein the prediction unit calculates the prediction uncertainty in the corresponding prediction result based on at least one of intrinsic uncertainty in the data or epistemic uncertainty in the model.

5. The system according to claim 1, wherein the data acquisition unit is further configured to, for each system,
   form an input dataset including the measurement value of the sensor having correlation with the power generation of the system, and
   form an input dataset including the measurement value of the sensor having correlation with the remaining useful life of the system.

6. The system according to claim 1, wherein the system assessment unit is configured to:
   calculate a power generation assessment index using a difference between the current power generation and the predicted power generation to assess the operational soundness in aspect of the power generation for the system, and
   determine a power generation assessment level based on the power generation assessment index.

7. The system according to claim 1, wherein the system assessment unit determines a remaining useful life assessment level by comparing the current remaining useful life with the predicted remaining useful life.

8. The system according to claim 1, wherein in case of false rejection, the system assessment unit determines the assessment level at a highest risk rank as the operational soundness of the system.

9. The system according to claim 1, wherein the system assessment unit determines the operational soundness of the system on preferential basis of the prediction uncertainty to determine the operational soundness of the system, and
wherein when the operational soundness of the system is determined on preferential basis of the prediction uncertainty, the assessment of the operational soundness of the corresponding system is completed.

10. The system according to claim 1, wherein the system assessment unit determines the operational soundness of the system further using a difference between the assessment results in aspect of the power generation and the remaining useful life or the risk rank to determine the operational soundness of the system based on the prediction uncertainty and the assessment results in aspect of the power generation and the remaining useful life.

11. A method for predicting power generation and remaining useful life for each system to predict operational soundness of a power plant, performed by a processor, the method comprising:
acquiring sensing data from each of a plurality of sensors included in a plurality of systems in the power plant;
calculating a predicted power generation and a predicted remaining useful life from a measurement value in sensing data of an input sensor through a pre-trained prediction model, and calculating prediction uncertainty in the corresponding prediction result;
assessing the operational soundness in aspect of the power generation using a prediction result and a current result in aspect of the power generation and assessing the operational soundness in aspect of the remaining useful life using a prediction result and a current result in aspect of the remaining useful life; and
determining the operational soundness of the system based on the prediction uncertainty and assessment results in aspect of the power generation and the remaining useful life, wherein the operational soundness of the system is determined on preferential basis of the prediction uncertainty to determine the operational soundness of the system, and wherein when the operational soundness of the system is determined on preferential basis of the prediction uncertainty, the assessment of the operational soundness of the corresponding system is completed.

12. The method for predicting power generation and remaining useful life according to claim 11, further comprising:
before inputting the sensing data to the prediction model, for each of the plurality of systems, selecting the sensing data of the sensor associated with the power generation of each system and the sensing data of the sensor associated with the remaining useful life of each system.

13. The method for predicting power generation and remaining useful life according to claim 11, wherein calculating the predicted power generation and the predicted remaining useful life comprises:
calculating the predicted power generation from a measurement value in the sensing data of the input sensor through a pre-trained power generation prediction model;
calculating the prediction uncertainty in the predicted power generation based on the calculated predicted power generation;
calculating the predicted remaining useful life from the measurement value in the sensing data of the input sensor through a pre-trained life prediction model; and
calculating the prediction uncertainty in the predicted remaining useful life based on the calculated predicted remaining useful life.

14. The method for predicting power generation and remaining useful life according to claim 11, wherein in case that both labeled data associated with the predicted power generation and the predicted remaining useful life indicates a high confidence level, the power generation assessment level or the remaining useful life assessment level is determined as the operational soundness of the system,
in case that any one of labeled data associated with the predicted power generation and the predicted remaining useful life indicates a high confidence level and the other indicates a low confidence level, the assessment result for the prediction result having a higher confidence level is determined as the operational soundness of the system,
in case that both labeled data associated with the predicted power generation and the predicted remaining useful life indicates a low confidence level, when the power generation assessment level and the remaining useful life assessment level match, the matched level is determined as the operational soundness of the system, or
in case that both labeled data associated with the predicted power generation and the predicted remaining useful life indicates a low confidence level, when the power generation assessment level and the remaining useful life assessment level do not match, the power generation assessment level or the remaining useful life assessment level is determined as the operational soundness of the system.

15. The method for predicting power generation and remaining useful life according to claim 11, further comprising:
generating an operational soundness assessment result of the power plant including the operational soundness of the system assessed for each of the plurality of systems.

16. A non-transitory computer-readable recording medium having recorded thereon a program for performing the method for predicting power generation and remaining useful life according to claim 11.

17. A method for predicting power generation and remaining useful life for each system to predict operational soundness of a power plant, performed by a processor, the method comprising:
acquiring sensing data from each of a plurality of sensors included in a plurality of systems in the power plant;
calculating a predicted power generation and a predicted remaining useful life from a measurement value in sensing data of an input sensor through a pre-trained prediction model, and calculating prediction uncertainty in the corresponding prediction result;
assessing the operational soundness in aspect of the power generation using a prediction result and a current result in aspect of the power generation and assessing the operational soundness in aspect of the remaining useful life using a prediction result and a current result in aspect of the remaining useful life; and
determining the operational soundness of the system based on the prediction uncertainty and assessment results in aspect of the power generation and the remaining useful life, wherein assessing the operational soundness in aspect of the power generation for the corresponding system at a target time comprises:
calculating a power generation assessment index using a difference between a current power generation and the predicted power generation, and
determining a power generation assessment level from the power generation assessment index calculated using a preset range, and
wherein assessing the operational soundness in aspect of the remaining useful life for the corresponding system at the target time comprises determining a remaining useful life assessment level by comparing a current remaining useful life with the predicted remaining useful life.

18. A method for predicting power generation and remaining useful life for each system to predict operational soundness of a power plant, performed by a processor, the method comprising:
acquiring sensing data from each of a plurality of sensors included in a plurality of systems in the power plant;
calculating a predicted power generation and a predicted remaining useful life from a measurement value in sensing data of an input sensor through a pre-trained prediction model, and calculating prediction uncertainty in the corresponding prediction result;
assessing the operational soundness in aspect of the power generation using a prediction result and a current result in aspect of the power generation and assessing the operational soundness in aspect of the remaining useful life using a prediction result and a current result in aspect of the remaining useful life; and
determining the operational soundness of the system based on the prediction uncertainty and assessment results in aspect of the power generation and the remaining useful life, wherein the operational soundness of the system is determined further using a difference between the assessment results in aspect of the power generation and the remaining useful life or the risk rank to determine the operational soundness of the system based on the prediction uncertainty and the assessment results in aspect of the power generation and the remaining useful life.

19. The method for predicting power generation and remaining useful life according to claim 18, wherein in case that any one of labeled data associated with the predicted power generation and the predicted remaining useful life indicates a high confidence level and the other indicates a low confidence level, the assessment result for the prediction result having a higher confidence level is determined as the operational soundness of the system,
in case that both labeled data associated with the predicted power generation and the predicted remaining useful life indicates a high confidence level, the assessment result for the prediction result having a higher risk rank is determined as the operational soundness of the system,
in case that both labeled data associated with the predicted power generation and the predicted remaining useful life indicates a low confidence level, when the power generation assessment level and the remaining useful life assessment level match, the matched level is determined as the operational soundness of the system,
in case that both labeled data associated with the predicted power generation and the predicted remaining useful life indicates a low confidence level, when a difference between the power generation assessment level and the remaining useful life assessment level is 1 level, the assessment result having a higher risk is determined as the operational soundness of the system, or
in case that both labeled data associated with the predicted power generation and the predicted remaining useful life indicates a low confidence level, when a difference between the power generation assessment level and the remaining useful life assessment level is equal to or larger than 2 levels, an intermediate level of the two assessment results is determined as the operational soundness of the system.

* * * * *